United States Patent [19]

Aubailly-Delalieu

[11] 4,099,610
[45] Jul. 11, 1978

[54] ENDLESS POWER-DRIVEN CONVEYOR WITH DISCHARGE COMB

[75] Inventor: Marc M. Aubailly-Delalieu, Nice, France

[73] Assignee: Societe Anonyme Eau-Gaz-Assainissement, Nice, France

[21] Appl. No.: 656,261

[22] Filed: Feb. 9, 1976

[30] Foreign Application Priority Data

Feb. 7, 1975 [FR] France .................. 75 04422

[51] Int. Cl.² .................................. B65G 19/00
[52] U.S. Cl. .............................. 198/729; 198/698; 198/735; 198/835
[58] Field of Search ............... 198/168, 172, 169, 173, 198/170, 195, 196, 197, 199, 190, 287, 692, 698, 699, 834, 835, 728, 729, 733, 735

[56] References Cited

U.S. PATENT DOCUMENTS

| | | | |
|---|---|---|---|
| 617,759 | 1/1899 | Millane | 198/170 X |
| 1,282,379 | 10/1918 | Christensen | 198/835 X |
| 2,546,318 | 3/1951 | Rayburn | 198/190 |
| 2,644,569 | 7/1953 | Francisco | 198/287 |

FOREIGN PATENT DOCUMENTS 150,050  4/1961  U.S.S.R. .................. 198/195

*Primary Examiner*—Evon C. Blunk
*Assistant Examiner*—Douglas D. Watts
*Attorney, Agent, or Firm*—Young & Thompson

[57] ABSTRACT

An endless power-driven conveyor has flights in the form of rakes whose teeth extend between a plurality of parallel comb elements that extend lengthwise of the upper run of the conveyor, for example for removing solids from a liquid. Two endless conveyor chains are interconnected by crosspieces beneath the comb elements; and the rake teeth upstand from these crosspieces. The head wheel of the conveyor has a recess to receive these crosspieces. The comb elements are curved about the head wheel and received in crenelations in the head wheel, the outer surfaces of the crenelations and the outer surfaces of the comb elements about the head wheel forming a continuous partially cylindrical contour. The comb elements then diverge downwardly from the head wheel and terminate in substantially vertical downwardly directed free ends which strip the solids from the rake teeth for gravity discharge of the solids into a container.

1 Claim, 4 Drawing Figures

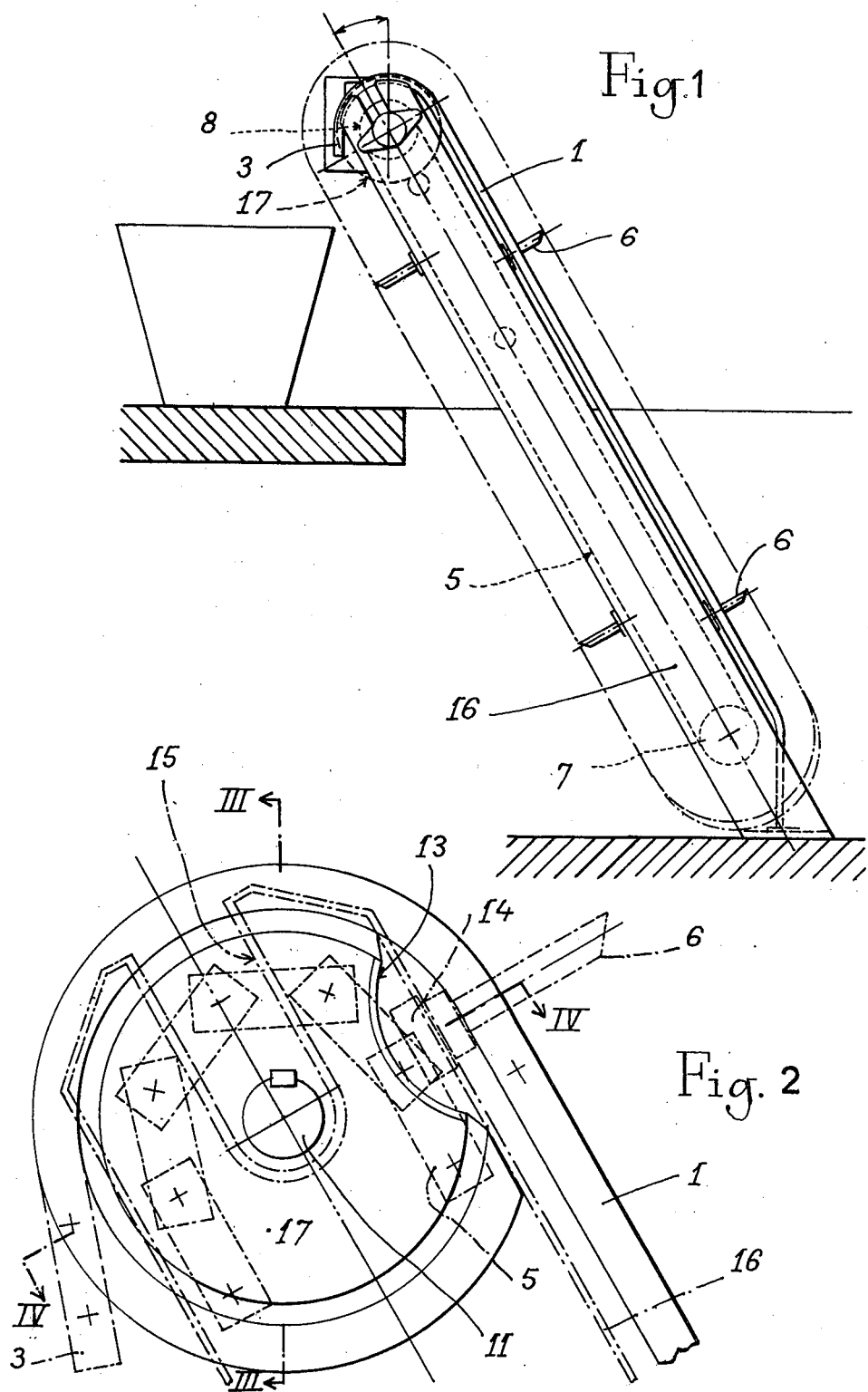

ENDLESS POWER-DRIVEN CONVEYOR WITH DISCHARGE COMB

The present invention relates to endless power-drive conveyors of the rake type, in which a pair of parallel flexible members circulate in an endless path and carry between them crosspieces having each a plurality of outstanding rake teeth thereon. Such conveyors are useful inter alia for the separation of solid matter from liquids, the upper run of the endless conveyor extending upwardly and there being a plurality of spaced parallel elongated comb elements along its upper run that extend between the rake teeth and above the crosspieces and then curve about the head wheel of the conveyor and thereafter diverge from the head wheel and extend downwardly and terminate in free ends, for stripping the solids from the rake teeth. The solids then fall by gravity into a suitable receptacle.

In such apparatus as heretofore proposed, the comb elements are fixed to the chassis of the conveyor at their upper ends. The endless chains are driven by toothed wheels that are disposed a certain distance below the end of the comb elements. At the upper end of the conveyor, solid materials such as rags and scraps of cloth become jammed at this point of attachment of the comb to the chassis, which jams the apparatus.

Such an apparatus is disclosed in French application No. 74 33887, filed Oct. 3, 1974.

Accordingly, it is an object of the present invention to provide such an apparatus, which avoids clogging or jamming.

Another object of the present invention is the provision of an endless conveyor of the type described, which will be relatively simple and inexpensive to manufacture, easy to operate, maintain and repair, and rugged and durable in use.

Briefly, the objects of the present invention are achieved by providing an endless conveyor which, instead of being vertical, has its lengthwise extent somewhat inclined to the rear, and which may accordingly make with the vertical an angle of about 30°.

The present invention is also characterized in that the upper ends of the comb elements, instead of being fixed to the chassis, are free and rest directly on the head wheel of the conveyor. To this end, so as to maintain the proper spacing and clearance between the comb elements, the head wheel has the configuration of a crenelated cylindrical drum, the upper curved ends of the comb elements resting directly on the drum within the crenelations thus provided.

The rake teeth are carried by the conveyor between the two chains on a crosspiece that interconnects the chains and from which the rake teeth extend outwardly between the comb elements and terminate in free ends. To accommodate this crosspiece as it goes about the head wheel, the head wheel is provided with at least one recess in its periphery, extending parallel to the axis of the head wheel, and the endless chains between which these crosspieces extend are driven by toothed wheels connected directly to the head wheel, on the drive shaft of the conveyor, so as to maintain the proper registry between the crosspieces on the endless conveyor and the recess or recesses in the head wheel.

Finally, the upper ends of the comb elements, instead of being rearwardly downwardly inclined as in the past, are substantially vertical at their free ends which diverge from the head wheel.

These and other objects, features and advantages of the present invention will become apparent from a consideration of the following specification, taken in connection with the accompanying drawings, in which:

FIG. 1 is a somewhat schematic side elevational view of a conveyor according to the present invention;

FIG. 2 is an enlarged fragment of the upper end of the conveyor of FIG. 1;

Figure 3:
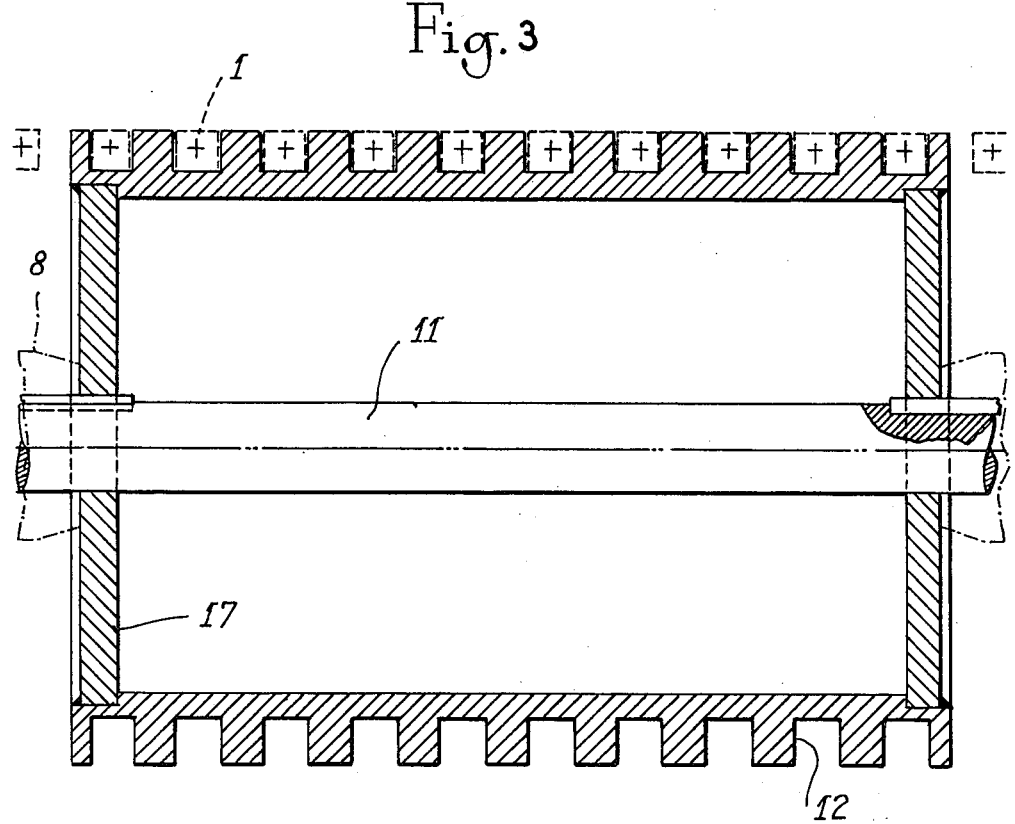
FIG. 3 is a cross section on the line III—III of FIG. 2.
Figure 4:
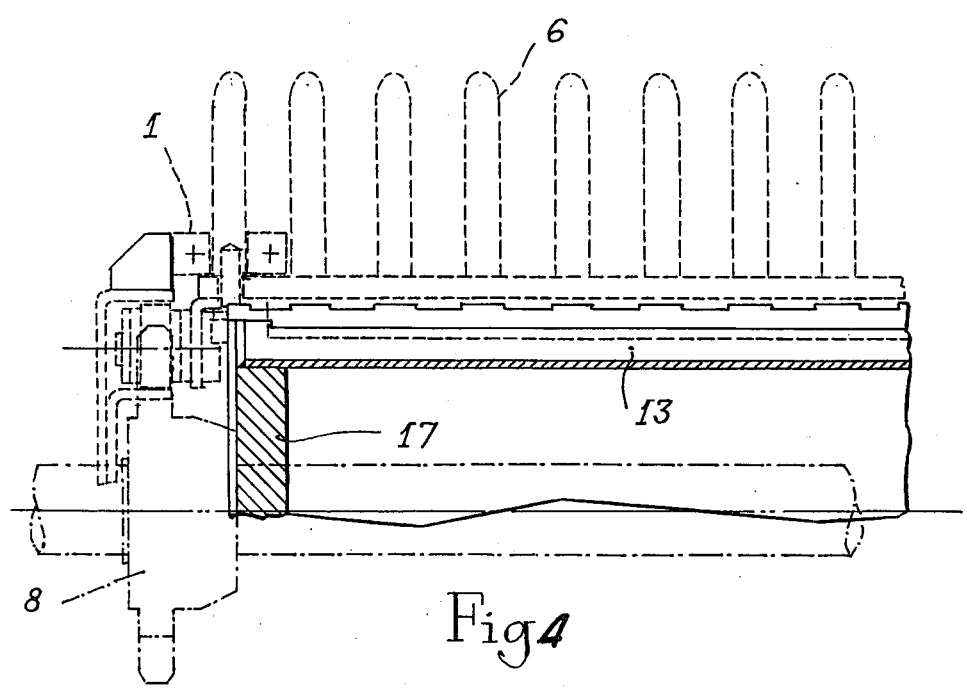
FIG. 4 is a fragmentary cross section on the line IV—IV of FIG. 2.

Referring now to the drawings in greater detail, there is shown an endless conveyor according to the present invention, including a plurality of elongated comb elements 1 that are disposed in spaced side-by-side parallel relationship, and which terminate at their upper ends in free ends 3 that are curved in a downwardly concave configuration, the free ends 3 themselves being vertical, although the comb elements are inclined over most of their length at an angle of about 30° to the vertical, that is, 60° to the horizontal.

The endless conveyor itself is comprised of a pair of parallel endless chains whose links 5 carry and are interconnected by crosspieces 14 to which a plurality of parallel upstanding teeth 6 are secured. Crosspieces 14 pass beneath comb elements 1, while teeth 6 extend outwardly between and beyond comb elements 1. The chains extend about and are driven by toothed wheels 8 fixed to drive shaft 11 at the upper end of the conveyor, the drive shaft 11 being power driven through conventional connections to a conveyor drive motor (not shown). At its lower end, the chains pass about a foot wheel 7 or a pair of toothed wheels.

A particularly important feature of novelty of the present invention is that the head wheel 17, which is fixed to shaft 11 and hence in fixed relation to the toothed wheels 8 about which the chains pass, is provided with a plurality of peripheral annular spaced parallel recesses 12 whereby the head wheel has the crenelated configuration shown best in FIG. 3. The downwardly concave upper ends of comb elements 1 are disposed in the recesses 12, as seen at the upper side of FIG. 3, and have the same curvature as the outer periphery of head wheel 17, so that about 150° of arc of the periphery of the head wheel is comprised by a substantially continuous part-cylindrical surface comprised by the outer edges of the crenelations of the head wheel, and the outer surfaces of the curved portions of the comb elements 1, which are thus disposed in substantially the same part-cylindrical profile as seen in FIG. 3. Solid material thus carried about the head wheel by the teeth 6 will pass smoothly over this substantially continuous surface and will not clog the conveyor mechanism.

The upper curved ends of the comb elements 1 thus rest on and are supported by the head wheel, which turns within and relative to the downwardly concave portions of the upper ends of these elements 1. The head wheel thus not only supports but also maintains properly spaced the elements 1.

As previously noted, the rake teeth 6 are mounted on crosspieces 14 that interconnect the endless chains; and to permit these crosspieces to traverse the head wheel, the head wheel is provided with at least one peripheral recess 13 extending parallel to the axis of the head wheel, in which the crosspiece 14 is received.

The endless conveyor is mounted on a chassis or frame 16 whose upper end is recessed at 15 to permit emplacement and removal of the drive shaft 11 and the toothed wheels 8 and the crenelated head wheel 17.

To reduce friction, the head wheel 17 and the comb elements 1 may be coated with low friction plastic (not shown).

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In an upwardly extending power-drive conveyor having a head wheel and an endless conveyor member passing about the head wheel and rake teeth on the endless member, there being a plurality of parallel comb elements extending between the rake teeth; the improvement in which the comb elements rest directly on the head wheel, the periphery of said head wheel having a plurality of spaced parallel annular recesses extending about the periphery thereof, the upper ends of said comb elements being disposed in said recesses, a drive shaft on which said head wheel is fixedly mounted, said endless conveyor comprising a pair of chains one disposed on either side of said head wheel, toothed wheels fixed to said shaft one on either end of said head wheel, said toothed wheels being in driving engagement with said chains, and a plurality of crosspieces extending between and interconnecting said chains, said rake teeth extending outwardly from said crosspieces between said comb elements, said crosspieces passing beneath said comb elements along the upper run of said conveyor, said head wheel having at least one recess therein extending the length of the head wheel parallel to the axis of the head wheel for reception of said crosspieces, said head wheel being also fixed to said shaft.

* * * * *